Feb. 26, 1952  C. ERICKSON ET AL  2,587,127
FROZEN CONFECTION APPARATUS
Filed July 20, 1950  3 Sheets-Sheet 1

CHARLES ERICKSON
AND ERICK SPELLMAN
INVENTORS:
BY C. F. Wm. Forssberg
ATTORNEY.

Feb. 26, 1952 C. ERICKSON ET AL 2,587,127
FROZEN CONFECTION APPARATUS
Filed July 20, 1950 3 Sheets-Sheet 2

CHARLES ERICKSON
AND ERICK SPELLMAN
INVENTORS:

BY C. F. Wm. Forssberg
ATTORNEY.

Feb. 26, 1952 — C. ERICKSON ET AL — 2,587,127
FROZEN CONFECTION APPARATUS
Filed July 20, 1950 — 3 Sheets-Sheet 3

CHARLES ERICKSON
AND ERICK SPELLMAN
INVENTORS:

BY C. F. Wm. Forssberg
ATTORNEY.

Patented Feb. 26, 1952

2,587,127

UNITED STATES PATENT OFFICE 2,587,127

FROZEN CONFECTION APPARATUS

Charles Erickson and Erick Spellman,
New York, N. Y.

Application July 20, 1950, Serial No. 174,974

16 Claims. (Cl. 259—10)

1

This invention relates to apparatus for freezing confections, ice creams, custards and the like, and particularly to such apparatus including means for positively producing a pressure upon the contents of the apparatus and even introducing air and providing what is termed gain in the art.

The main object of our invention is to facilitate introducing the prepared fluid mix into the machine under pressure and feeding it toward the discharge end of the machine.

Another object is to include in a machine of the indicated character, a fluid driving pump simultaneously operated with the scraper shaft or dasher of the machine.

A further object is to include on a machine of the mentioned type, a pump mounted on the machine for receiving the fluid mix used and secured to the rear plate of the freezing cylinder and directly driven by the scraper shaft which extends therethrough.

It is, of course a practical object to include in the construction of such a freezing machine the fluid pump as already indicated in such a convenient and yet unobtrusive position that the presence of the pump in no way impedes use or operation of the machine, but instead greatly improves smooth delivery of the frozen product from the discharging end thereof.

A further practical object is to have a machine of the mentioned character upon which the pump may be built into the freezing cylinder or exteriorly thereof while still functioning according to the same principles in either position.

Other objects and advantages of our invention will appear in further detail as the specification proceeds.

This application is a continuation in part of our abandoned application Serial No. 146,742, filed February 28, 1950.

In order to facilitate ready comprehension of this invention for a proper appreciation of the salient features thereof, the invention is illustrated on the accompanying drawings forming part hereof, and in which:

Figure 4 is a fragmentary vertical section of

Figure 1:
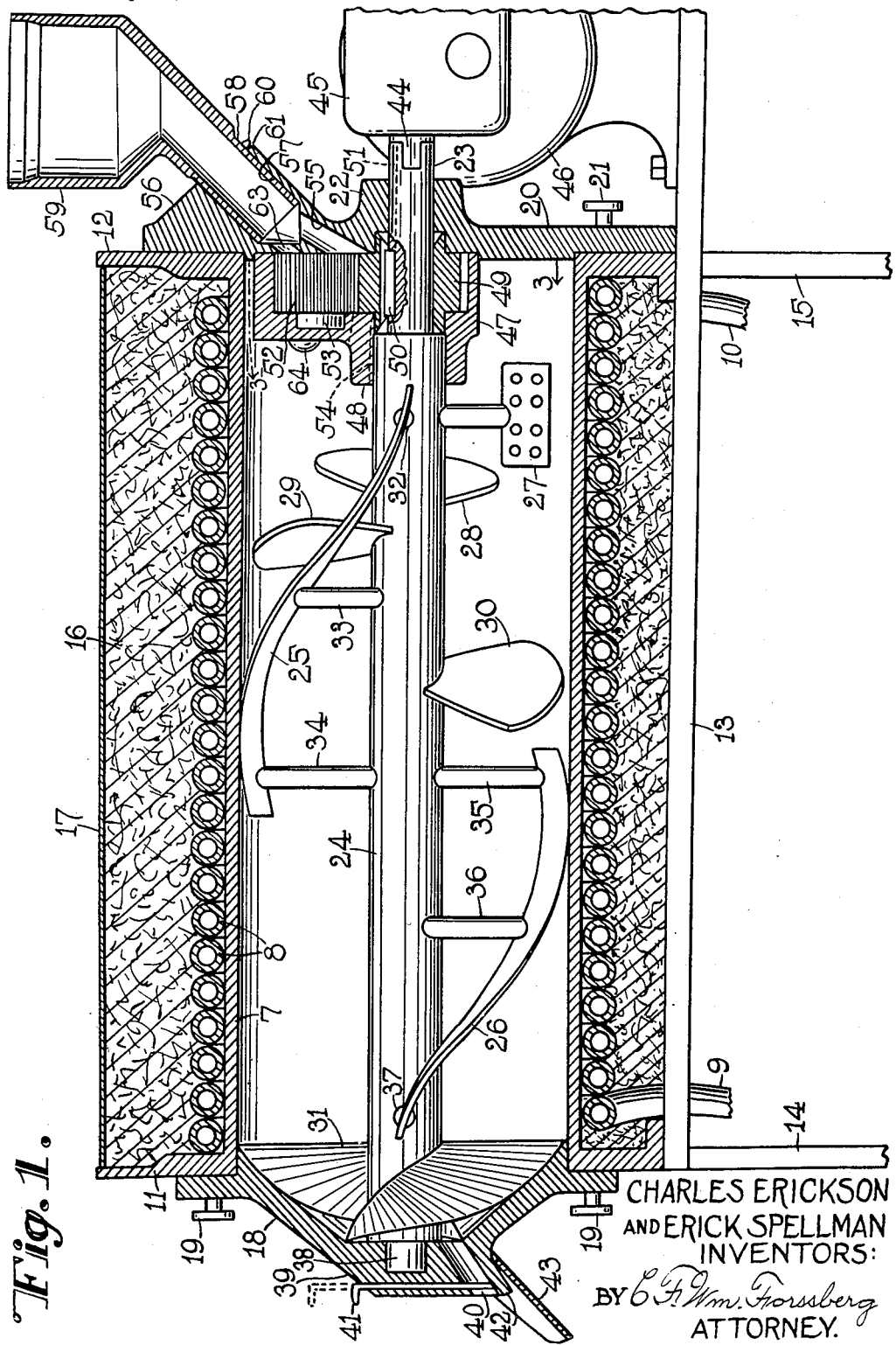
Figure 1 is a vertical longitudinal section of an apparatus for freezing custard and ice creams and provided with a pump built into the freezing cylinder thereof and embodying our invention in a practical form.
Figure 5:
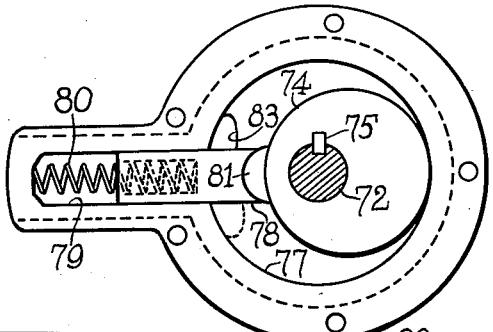
Figure 4:
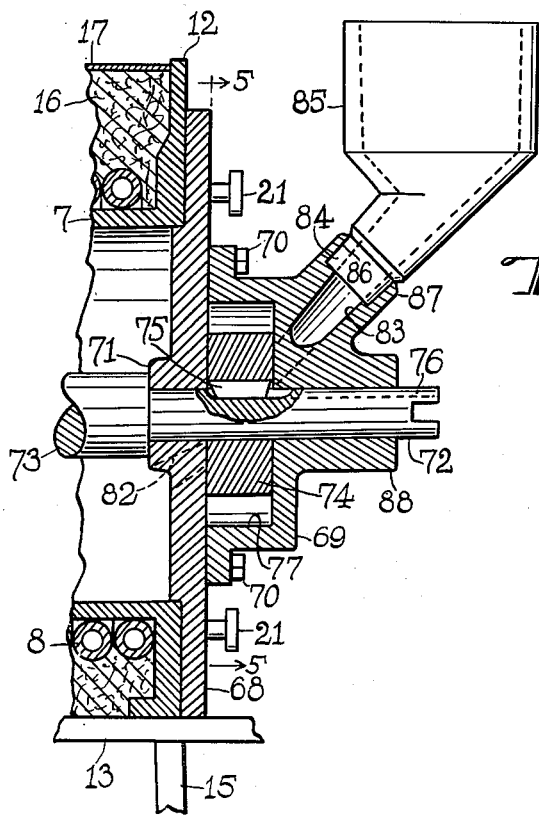
Figure 6:
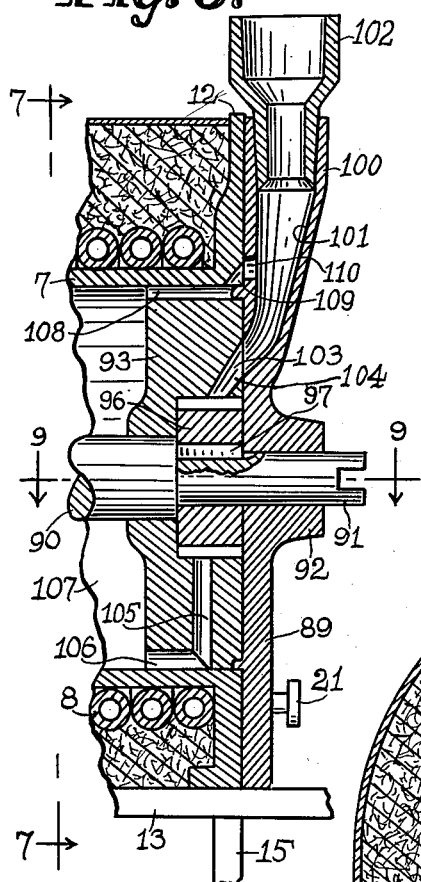
Figure 8:
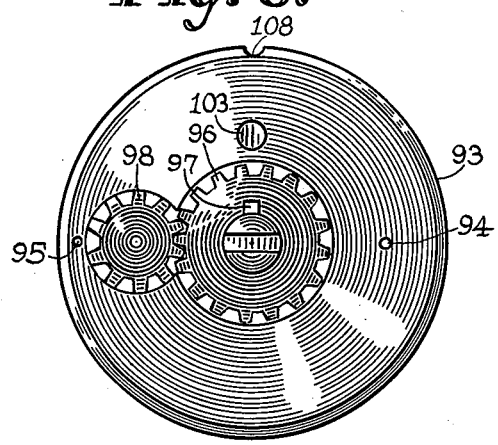
Figure 7:
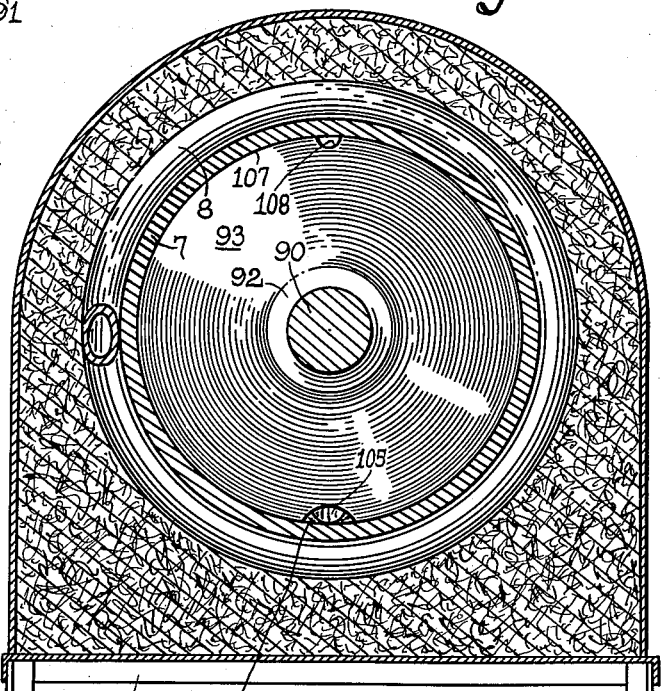
Figure 9:
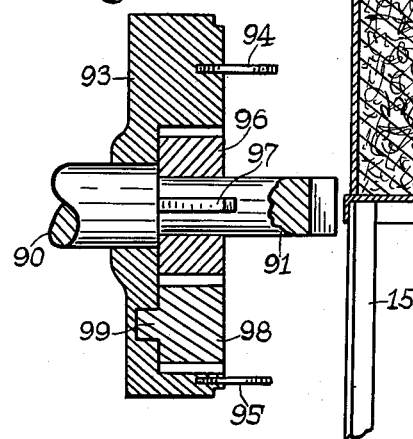

2 the rear portion of a modification of the machine shown in Figure 1;

Figure 5 is an elevation of the pump alone of Figure 4 as taken on line 5—5;

Figure 6 is another fragmentary vertical section of the rear portion of a further modification of the machine of Figure 1 while resembling the latter more than in the case of Figure 4;

Figure 7 is a vertical cross section of the machine of Figure 6 as taken on line 7—7;

Figure 8 is a rear elevation of the main pump casing or block with its gears as seen from the right in Figure 6; and Figure 9 is a horizontal section of the same pump casing and gears as taken on line 9—9 in Figure 6.

Throughout the views, the same reference numerals indicate the same or like parts.

In machines for freezing various fluid or semifluid mixtures for making ice creams, frozen custards and malted milk and the like, a freezing cylinder is commonly used together with a drive shaft extending through the cylinder axially and carrying scrapers or knives, the mixture being poured or introduced at or adjacent to one end of the cylinder, while the other end is provided with a dispensing plate through which the frozen material is delivered. However, sometimes the frozen material is rather hard and not easily propelled forward from the rear end from which the mix is intended to be moved toward and through the dispensing plate or head at the other end of the cylinder. Thus, the feeding of the freezing mixture is more or less sluggish and uncertain, and presents a problem.

Upon considering this problem, it has occurred to us that the material being introduced into the apparatus should be positively propelled by means of a pump operated by the scraper shaft and forcing the material forward and thus definitely expelling it through the dispensing head. As a result, we have succeeded in combining a positively driven pump with a confection freezing apparatus in a very effective manner, as will be explained in detail in the following.

Hence, in the practice of our invention, the confection freezing apparatus embodying the invention in a preferred form primarily includes a freezing cylinder 7 surrounded by a tubular freezing coil 8 with the ends 9 and 10 thereof adapted to be connected to a powered refrigeration unit of known construction (not shown). At the ends, the cylinder 7 terminates on a supporting frame 13 having the corner posts 14, 15, etc. The space about the refrigerating coil 8 is filled with insulating material 16 such as rock wool, asbestos and the like, and a sheet metal cover 17 encloses the latter material and prevents loss or displacement thereof.

Upon the front flange 11 is removably mounted a dispensing head or plate 18 held in position by means of a group of manually releasable screws 19, 19 or the like, while in similar fashion, a rear plate 20 is releasably secured to the rear flange 12 by means of a second group of hand screws 21 (one shown). In the rear plate is a central bearing 22 for rotatably supporting the rear reduced end 23 of a scraper shaft 24 which carries various scrapers or knives 25, 26, a paddle beater 27, and several propelling blades 28, 29, 30, as well as a front dispensing propeller 31, the scrapers being supported on arms 32 to 37 mounted rigidly upon shaft 24. The forward end 38 of the latter shaft is reduced in diameter and finds a supporting bearing in the projecting nose 39 of front dispensing head 18.

In the dispensing head is a forwardly inclined outlet port 40 controlled by a vertically shiftable sliding shutter 41 capable of being raised to open position as indicated in broken lines, while beneath the resulting spout 42 is mounted a short chute for directing the frozen condiment into a vessel placed beneath the chute for receiving it. The details of the machine thus far may be varied and more or less conventional, and per se forms no actual part of the invention when taken alone. The rear end 23 of the scraper shaft is bifurcated or otherwise formed to engage with the projecting shaft 44 of the drive mechanism (not shown) with casing 45 mounted upon motor 46 which in turn is supported on frame 13 and drives shaft 44. Due to its construction, shaft end 23 may be withdrawn through bearing 22 when the front dispensing head is first removed for cleaning the interior of the cylinder and the shaft as a whole.

Upon the inner side of rear plate 20 is removably secured a gear pump casing 47 having an auxiliary bearing 48 for the reduced rear portion of the scraper shaft, a pinion 49 being keyed by a key 50 slidably engaging in keyway 51 in said shaft to rotate positively with the latter. Above the pinion is rotatably supported a gear 52 within the gear casing 47 and in mesh with the pinion, the gear stub shaft 53 serving to center the gear for smooth running in the casing. The rear plate 20 serves as part of the pump or gear casing by forming the rear wall thereof. While the pump gears 49 and 52 thus serve to pump fluid when the scraper shaft rotates by the drive of motor 46 in more or less conventional manner, the casing 52 is provided with a delivery port 54 directed into the cylinder, and an inlet port 55 directed rearwardly upward. The upper portion 56 of rear plate 20 is enlarged and provided with a large bore 57 communicating with port 55 and receiving the small inclined end 58 of a supply hopper or funnel 59 into which fluid mixture to be frozen may be poured for introduction into the machine. A pin 60 on tube fits in a slot 61 in member 56 to prevent accidental rotation of the funnel or hopper.

At substantially the same level with delivery port 54 in casing 52 is an air escape port 62 which allows excess air to pass out through the gear pump and escape through upper port 63 in rear plate 20. Also, to allow excess pressure built up within the cylinder to escape, a valve 64 in valve seat 65 in casing 52 more directly communicates through the casing with outlet port 63 in the rear plate. The mentioned port or passage 62 forms no criterion of the air movement, as the valve 64 is more important and prevents excess air being worked into the freezing mass within the cylinder. Spring 66 closes valve 64.

Figure 2:
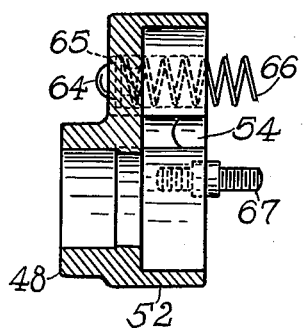
Figure 2 is a vertical central section of the pump casing of the machine shown in Figure 1.

The net result of the construction described is that when fluid ice cream or custard mixture is poured into the funnel 59, the motor started so that scraper shaft 24 rotates at intended speed, the mixture will be fed positively through the pump by gears 49 and 52 into the cylinder 8, and assuming that the latter is already full of freezing mixture of cream or custard, the contents will be subjected to pressure, thus forcing the contents toward the front dispensing head. The air outlet port 63 serves to allow air mixed or trapped with the mixture being poured in from the funnel to escape before reaching the pump gears, in addition to liberating air from valve 64. As key 50 readily slides out of keyway 51 in shaft end 23, the shaft may be withdrawn from the pump and both bearings 22 and 48. As double ended screws 67 (one shown in Figure 2) normally secure casing 52 to the gear plate 20, release of these screws will free the casing from the rear plate when the latter has first been released from rear flange 12 of cylinder 8, and allows the gears to be taken out and all parts washed.

Two features of the invention may readily be modified, namely, the location of the pump and also the actual form of the pump used. For example, the pump, while intended to be associated with the supply of the fluid mix introduced into the machine, and preferably exteriorly of the rear plate when desired, may be a gear pump or some other rotary type of pump, one such pump of more or less conventional design being shown in Figures 4 and 5. In this case, the rear plate 68 has an external pump casing 69 removably secured thereto by screws 70, 70, the plate itself being held to rear flange 12 by hand screws 21, 21. Plate 68 has a main bearing 71 for the rear reduced portion 72 of the scraper shaft which is similar to the eccentric rotor 74 in which is fixed a key 75 slidable in keyway 76 in the shaft. Variably extending into pump chamber 77 in casing 69 is a blade 78 slidably mounted in a slot 79 and biased toward the rotor by a spring 80, a rocking contact shoe 81 sliding directly against both the blade and the rotor.

The end plate forms one wall of the pump casing as before, and has an inlet port 82 extending therethrough to introduce into the cylinder the fluid mix pumped by rotor 74, a downwardly and inwardly inclined inlet passage 83 in casing 69 communicating with chamber 77 from the outside. The reduced lower inclined end 84 of funnel 85 fits in the upper bore 86 in tubular extension 87 upon the casing 69 and thus connects with the pump through passage 83 in such manner as to supply the mixture poured into the funnel to the pump. As the latter is positively driven by shaft 72, which is, of course driven as described in connection with shaft 24, 51, the fluid mixture introduced by the pump will be fed into the cylinder under pressure.

The pump casing, rotor and rear plate form an assembly in which each part may be removed from the rest and all parts readily cleaned. Although plate 68 provides a bearing 71 for shaft portion 72, the pump casing also has a further bearing 88 for the shaft when the pump is assembled.

As shown in Figures 6 to 9, a further modification of the rear portion of the machine has a rear plate 89 with the scraper or dasher shaft 90 projecting by its rear reduced portion 91 rotatably therethrough and adapted to be connected to a rear drive as in the case of the machine in Figure 1. The rear plate is held by hand screws 21 to the rear flange 12 of freezing cylinder 7 and has a boss 92 forming the rear bearing of the shaft portion 91, while within the cylinder is mounted a pump casing 93. This casing is held to the rear plate by means of a pair of threaded studs 94, 95 extending through the rear plate and secured by a pair of wing nuts (not shown) in more or less obvious manner.

In pump casing 93 is a rotatable pump gear 96 removably mounted on reduced portion 91 of scraper shaft 90 and positively rotated therewith by a removable key 97. A second pump gear or pinion 98 is also rotatable in the same pump casing by meshing with gear 96, the short central stud 99 rigid with gear 98 retaining the latter in smooth centered running position. Both gears are, of course removable, which is likewise true of the pump casing and the scraper shaft for cleaning thereof.

Downwardly through the upper portion of rear machine plate 89 extends a tapered passage 101 into the upper end of which fits a removable funnel 102 or the like for receiving ice cream or frozen custard mixture from a large container (not shown). Upon the inner side of the rear plate, the descending passage 101 extends through the surface in the form of an aperture 103 that connects directly with the upper intake passage 104 in the pump casing which feeds the descending mixture from funnel 102 to the gears 96 and 98 of the pump. From these gears extends a downward feeding passage 105 in pump casing 93 communicating with horizontal bottom passage 106 opening into the cylinder chamber 107.

If the machine is completely assembled and mixture to be frozen is poured into funnel or cup 102, and the machine operated by the drive as illustrated in Figure 1, the mixture will be fed down through the pump casing passages to bottom passage 106 and thence into the cylinder chamber 107, providing a positive feed for the mixture through the freezing cylinder.

Figure 3:
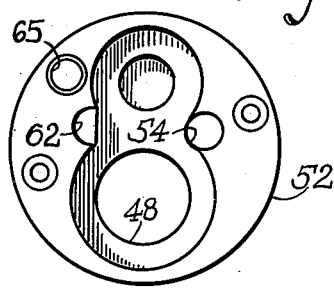
Figure 3 is an elevation of the same pump casing as taken on line 3—3 in Figure 1.

In order to allow air to escape from the mixture during operation if trapped to excess within the chamber 107, a top groove or passage 108 is formed in the pump casing 93 communicating through a bypass 109 in the rear of cylinder 7 and its rear flange 12 with intake passage 101 through an aperture 110. If desired, a valve may be included to block or control passage 108 or to relieve excess pressure as in the case of valve 64 already described in connection with Figures 1, 2 and 3.

We are, of course not limited to the specific forms of pumps shown, as rotary pumps of many types are known and may serve for the present purpose. It is likewise true that a pump for the type of machine outlined hereabove may be located upon the inside or upon the outside of the rear head or end of the freezing cylinder and may even be built into the rear head in a manner differing from what has been described above.

Manifestly, variations may thus be resorted to and parts and features may be modified further or used without others within the scope of the appended claims.

Having now fully described our invention, we claim:

1. A positive feed confection freezing apparatus, including a freezing cylinder, a confection dispensing end upon the cylinder, a fluid mix funnel or hopper directly mounted upon and secured to another portion of the cylinder and communicating with the interior thereof, a scraper shaft rotatably mounted in said cylinder, and a pump secured to the apparatus and driven by said scraper shaft and effective to deliver the fluid mix from said funnel or hopper under pressure to the interior of said cylinder.

2. A positive feed confection feeding apparatus including a freezing cylinder, a confection dispensing head at one end of the cylinder, a rear head or plate at the other end of said cylinder, said rear head having an inlet port extending therethrough to the interior of the cylinder, a pump casing mounted upon and secured to the rear head and communicating with the inlet port, means for supplying fluid mixture to be frozen to the pump casing, a scraper shaft rotatably mounted in said cylinder, means for driving said scraper shaft, pump elements movably located in said pump casing and internally driven by said scraper shaft, and releasable means holding said casing to said rear head.

3. A positive feed confection freezing apparatus according to claim 2, wherein the pump casing is mounted directly upon the inner side of the rear head within the cylinder and the rear head has a passage therethrough for receiving the fluid mix to be frozen through said head and conducting it to said pump casing.

4. A positive feed confection freezing apparatus according to claim 2, wherein the pump casing is mounted directly upon the exterior of the rear head and the latter is removably secured upon the rear end of the cylinder.

5. A positive feed confection freezing apparatus according to claim 2, wherein both the rear head and the pump casing each has a bearing for the rear end of the scraper shaft.

6. A positive feed confection freezing apparatus according to claim 2, wherein the rear head forms one side of the pump casing and the pump casing proper is directly mounted on the rear head in effective position to co-operate with said rear head to form a complete pump casing therewith.

7. A positive feed confection freezing apparatus according to claim 2, wherein the means for supplying the fluid mix to be frozen comprises a funnel or hopper mounted directly on the rear head and communicating the contents thereof to the pump casing also mounted on said rear head.

8. A positive feed confection freezing apparatus according to claim 2, wherein the means for supplying the fluid mix to be frozen comprises a funnel or hopper mounted upon the pump casing directly and supported by the latter.

9. A positive feed confection freezing apparatus, including a freezing cylinder having a dispensing head at one end thereof, a rear head mounted upon the other end of the cylinder, the latter having an inlet port extending therethrough to the interior of the cylinder, a scraper shaft rotatably mounted in said cylinder, a bearing in said rear head for the rear portion of said scraper shaft, a pump casing removably secured directly upon the exterior of the rear head with the latter head forming one side of the pump casing, a second bearing for the rear portion of said scraper shaft upon said pump casing, pump elements within said pump casing internally driven directly by said scraper shaft for pumping fluid mix to be frozen into said cylinder under pressure, means for driving said scraper shaft, and means for supplying the fluid mix to said pump casing.

10. A confection freezing apparatus including a freezing cylinder having a dispensing head at one end and a rear head at the other end, a pump supported directly upon the rear head and communicating with interior of the cylinder, a scraper shaft rotatable in the latter, means for driving said scraper shaft, means for supplying fluid mix to be frozen to the pump casing, and at least one pump element in said casing directly connected to and driven by said shaft.

11. A positive feed confection freezing apparatus, including a hollow freezing cylinder; a frozen confection discharging end plate upon one portion of the cylinder; a fluid mix intake funnel or cup directly mounted upon another portion of the cylinder and communicating with the interior thereof; a scraper shaft axially mounted for rotation with respect to said cylinder; means for driving said scraper shaft; a pump casing removably mounted upon and directly connected to said cylinder and having an intake passage communicating with said funnel or cup and an outlet passage opening into the interior of said cylinder; and at least one movable pump element located in said pump casing in communication with said intake and outlet passages, said pump element being disposed in effective contact with said scraper shaft to be directly driven thereby upon rotation of said scraper shaft.

12. A positive feed confection freezing apparatus, including a hollow freezing cylinder; a frozen confection discharging means upon one portion of the cylinder; a scraper shaft axially mounted for rotation in said cylinder; means for driving the scraper shaft; a pump casing removably mounted upon and directly connected to another portion of said cylinder and having at least one bearing for rotatably supporting a portion of said scraper shaft; pump elements operably located in said pump casing, one pump element being in effective contact with and surrounding said scraper shaft to be driven directly thereby upon rotation of said shaft; said pump casing having an intake passage leading to the pump elements within it and a discharge passage leading from said pump elements to the interior of said cylinder; and a fluid mix funnel or cup directly mounted upon said apparatus and communicating through said intake passage in said pump casing with said pump elements.

13. A positive feed confection freezing apparatus, including a hollow freezing cylinder; a frozen confection discharging end upon one portion of the cylinder; a scraper shaft rotatably mounted in the cylinder; means for driving the scraper shaft; a two-part pump casing removably mounted upon and directly connected to another portion of said cylinder and having at least one bearing for rotatably supporting a portion of said scraper shaft; pump elements operably located in said two-part pump casing with one pump element operably connected to and surrounding said scraper shaft so as to be driven directly thereby upon rotation of said scraper shaft, said pump casing having one part thereof exposed to the interior of said cylinder and said pump casing having an intake passage leading to the pump elements within it and an outlet passage leading from said pump elements to the interior of said cylinder; and a fluid mix funnel or cup mounted directly upon said apparatus communicating with the interior of said pump casing through the intake passage therein.

14. A pump feed confection freezing apparatus, including a hollow freezing cylinder; a frozen confection discharging end upon one portion of the cylinder; a scraper shaft rotatably mounted in said cylinder; means for driving said scraper shaft; a rear end plate upon another portion of said cylinder having a bearing rotatably supporting one portion of said scraper shaft; a pump casing located within said cylinder directly upon the inner side of the rear end plate so as to be exposed to the interior of said cylinder and also having an additional bearing for supporting said one portion of said scraper shaft; pump means operable within said pump casing and positively connected internally to said scraper shaft so as to be operated thereby upon rotation of said scraper shaft, a portion of said rear end plate having an intake passage leading from the exterior to the pump means within it and said pump casing having a discharging passage leading from said pump means within the casing to the interior of said cylinder; and a mix receiving cup located directly upon said rear end plate and communicating with the intake passage therein.

15. A pump feed confection freezing apparatus according to claim 14, wherein the rear end plate has an air aperture through the wall thereof from an intermediate portion of the intake passage therein to the inner side of said plate, and wherein said pump casing has a further passage in the upper portion thereof communicating with said air aperture and with the interior of said cylinder.

16. A pump feed confection freezing apparatus according to claim 15, wherein the upper portion of the rear end of the cylinder has a bypass portion providing communication between the air aperture in the rear end plate and the further passage of the pump casing.

CHARLES ERICKSON.
ERICK SPELLMAN.

REFERENCES CITED

The following references are of record in the file of this patent:

UNITED STATES PATENTS

| Number | Name | Date |
| --- | --- | --- |
| 2,054,835 | Routh | Sept. 22, 1936 |
| 2,191,344 | Erickson et al. | Feb. 20, 1940 |
| 2,211,387 | Routh | Sept. 13, 1940 |